(12) United States Patent
Chien et al.

(10) Patent No.: US 7,804,490 B2
(45) Date of Patent: *Sep. 28, 2010

(54) METHOD FOR MULTIPLE GESTURE DETECTION AND VERIFICATION ON A TOUCHPAD

(75) Inventors: Yung-Lieh Chien, Taoyuan (TW); Jia-Yih Lii, Taichung (TW)

(73) Assignee: Elan Microelectronics Corporation, Hsinchu (TW)

( * ) Notice: Subject to any disclaimer, the term of this patent is extended or adjusted under 35 U.S.C. 154(b) by 947 days.

This patent is subject to a terminal disclaimer.

(21) Appl. No.: 11/334,417

(22) Filed: Jan. 19, 2006

(65) Prior Publication Data

US 2007/0013669 A1  Jan. 18, 2007

(30) Foreign Application Priority Data

Jul. 12, 2005  (TW) ................ 94123655 A (51) Int. Cl.
*G06F 3/041* (2006.01)
(52) U.S. Cl. ..................................... 345/173
(58) Field of Classification Search ................ 345/173, 345/174, 176; 178/18.01–18.09; 340/709
See application file for complete search history.

(56) References Cited

U.S. PATENT DOCUMENTS 4,455,452 A * 6/1984 Schuyler .................. 178/18.06
2004/0178997 A1* 9/2004 Gillespie et al. ............ 345/173

* cited by examiner

*Primary Examiner*—Richard Hjerpe
*Assistant Examiner*—Shaheda A Abdin
(74) *Attorney, Agent, or Firm*—Rosenberg, Klein & Lee (57) ABSTRACT

In a gesture detection method for a touchpad, various gestures such as tap, drag and double tap are determined by operating an object to touch on the touchpad, leave from the touchpad, and move on the touchpad.

12 Claims, 9 Drawing Sheets

METHOD FOR MULTIPLE GESTURE DETECTION AND VERIFICATION ON A TOUCHPAD

FIELD OF THE INVENTION

The present invention is generally related to a detection method for a touchpad and, more particularly, to a method for gesture detection on a capacitive touchpad.

BACKGROUND OF THE INVENTION

Figure 1:
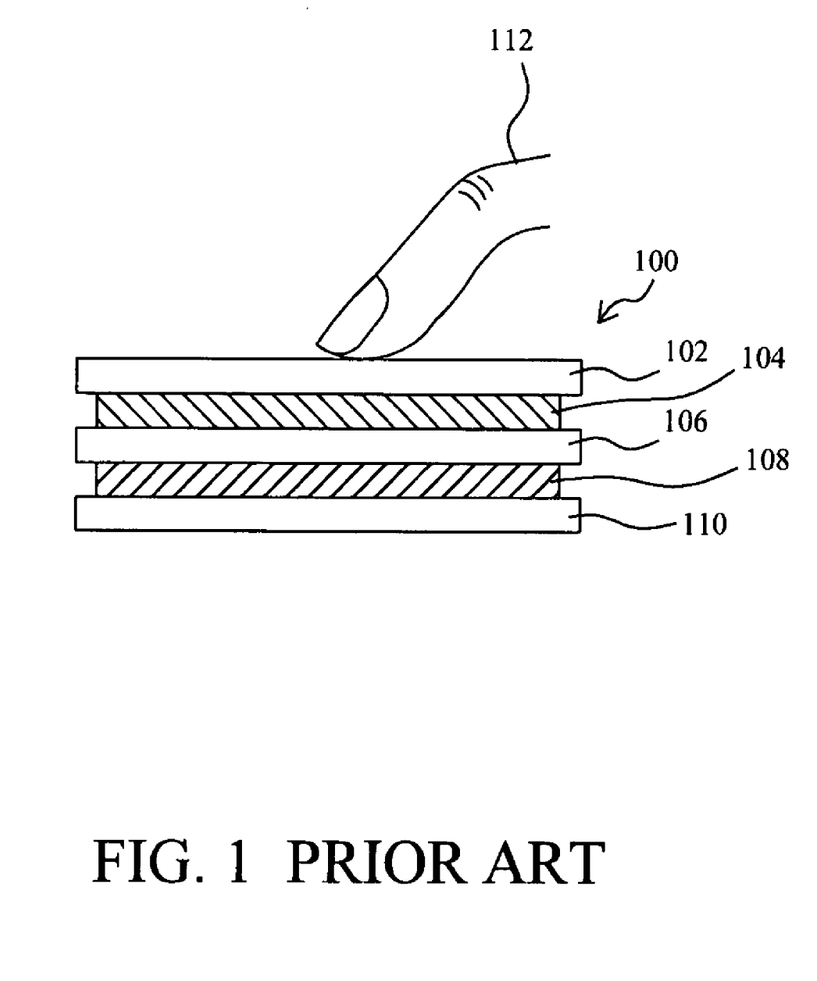
FIG. 1 is a cross-sectional view of a conventional two-dimensional capacitive touchpad.
Figure 2:
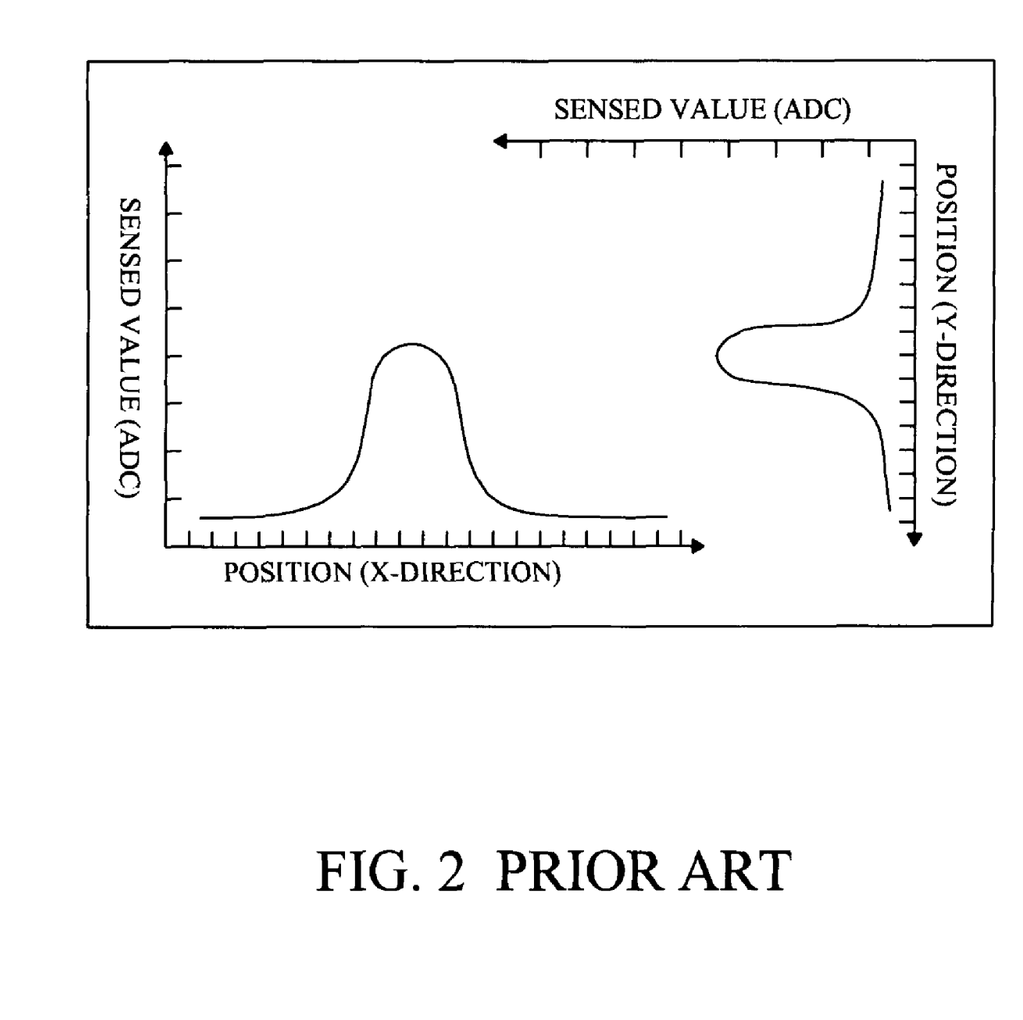
FIG. 2 shows a relationship between the sensed value and the touched position of the touchpad shown in FIG. 1.
Figure 3:
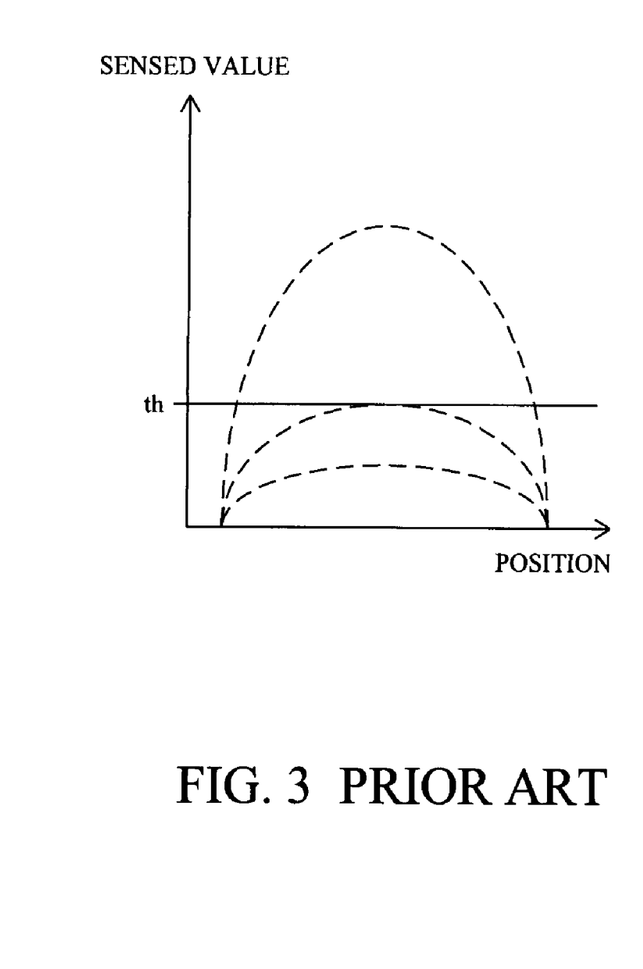
FIG. 3 shows a variation of the sensed value on the touchpad shown in FIG. 1.
Figure 4:
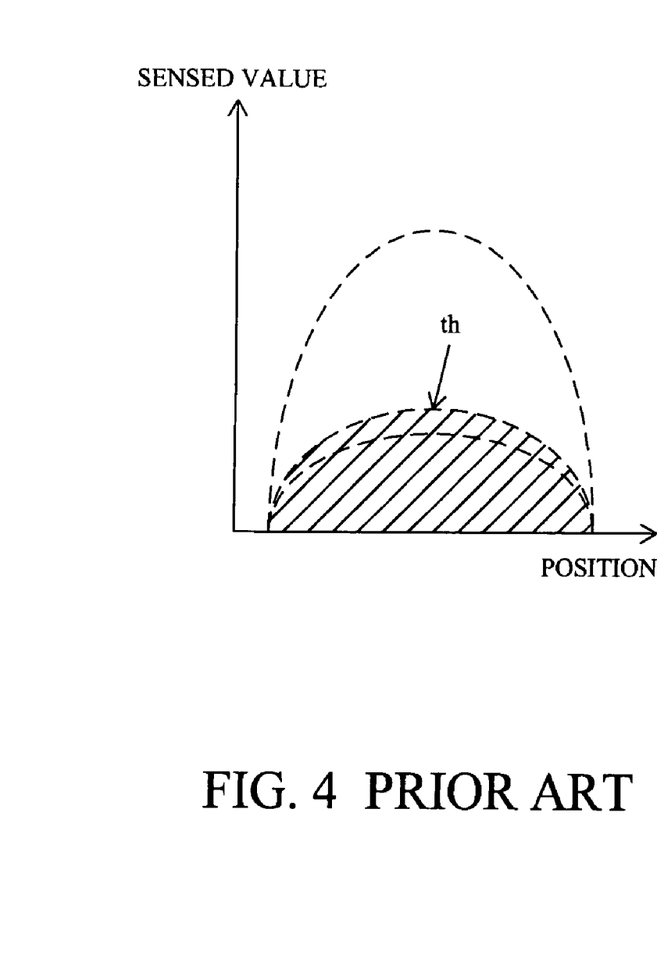
FIG. 4 shows a variation of the cumulative sensed value on the touchpad shown in FIG. 1.

Capacitive touchpad is an input device that allows user to slide his finger on a smooth panel thereof for cursor movement control. Because of its very small thickness, capacitive touchpad can be designed in slim notebooks, keyboards, digital media players and other devices, and moreover, due to its non-mechanical design it is virtually maintenance free. FIG. 1 is a cross-sectional view of a conventional two-dimensional capacitive touchpad 100, which comprises a panel 102, a Y-axial sensing layer 104, an insulating layer 106, an X-axial sensing layer 108, and a bottom plate 110. When a finger 112 touches on the panel 102, the sensed value (in capacitance) on the touched position will varies, and the control circuit connected to the touchpad 100 can convert the capacitance on the touchpad 100 to a sensed value as shown in FIG. 2, by which the position where the finger 112 touches and the moving distance and the moving direction of the finger 112 can be determined. Conventionally, there are two methods to determine whether an object touches on the touchpad 100. In the first method, the sensed value on the touchpad 100 is used to determine if an object touches on the touchpad 100 by the way as shown in FIG. 3. When the sensed value is greater than a threshold th, it is determined that an object touches on the touchpad 100, and on the contrary, when the sensed value is less than the threshold th, it is determined that the object leaves the touchpad 100 or no object touches on the touchpad 100. In the second method, the cumulative sensed value on the touchpad 100 is used to determine if an object touches on the touchpad 100 by the way as shown in FIG. 4, by which, if the cumulative sensed value is greater than a threshold th, it is determined that an object touches on the touchpad 100, otherwise it is determined that the object leaves the touchpad 100 or no object touches on the touchpad 100. However, these two detection methods might be interfered by external noises, which will cause erroneous determination and accordingly operation that is not desired or predicted. Moreover, the operations of tape, drag, double tape and other gestures on the touchpad 100 are determined based on the time relationship when an object is operated to touch on the touchpad 100, leave from the touchpad 100, and move on the touchpad 100, and thus, for a user using the touchpad 100 first time or being unfamiliar with operating the touchpad 100, the action might not be so definite that the touchpad 100 will detect thereto incorrectly and cause inconvenient use.

Therefore, there is a need of a detection method for a touchpad that will avoid noise to interfere the operation of the touchpad and have the touchpad to be easy to operate therewith.

SUMMARY OF THE INVENTION

An object of the present invention is to provide a gesture detection method for a touchpad for preventing the operation of the touchpad from noise interference.

In a gesture detection method for a touchpad, according to the present invention, various gestures such as tap, drag and double tap are determined by operating an object to touch on the touchpad, leave from the touchpad, and move on the touchpad.

DETAILED DESCRIPTION OF THE INVENTION

In a detection method for a capacitive touchpad according to the present invention, the noise resistive capability of the touchpad is enhanced without any improvement on the hardware detection circuit of the touchpad, and several gestures for operations on the touchpad can be distinguished by such method.

<Detection for Verifying an Object Down>

Figure 5:
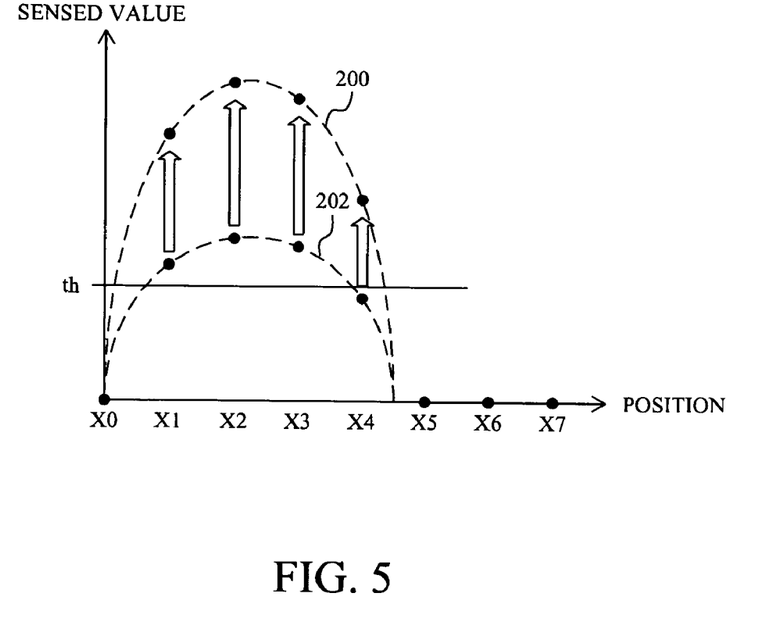
FIG. 5 shows a variation of the sensed value on the touchpad shown in FIG. 1 when the sensed value becomes greater than a down threshold.
Figure 6:
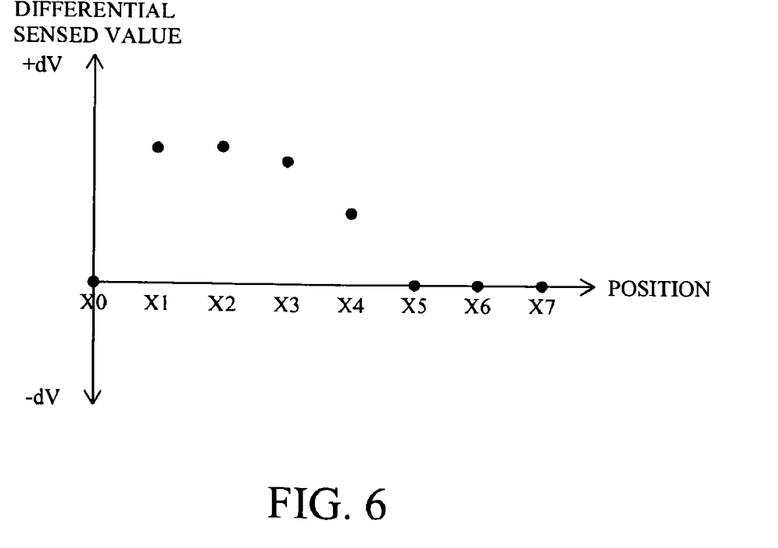
FIG. 6 shows a difference between two sensed values shown in FIG. 5.
Figure 7:
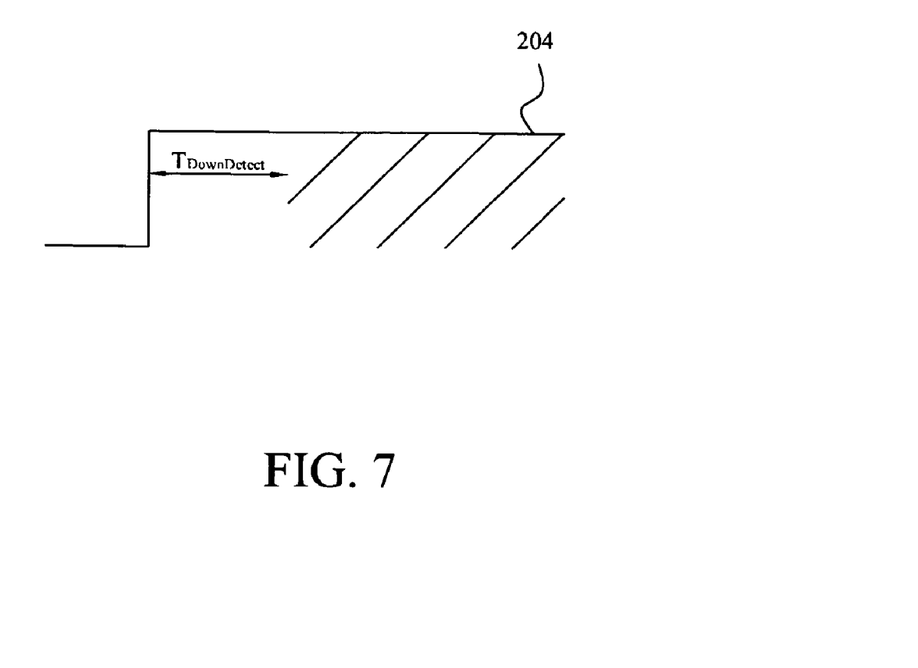
FIG. 7 shows a detected signal.

In FIG. 5, it is shown a variation of the sensed value on the touchpad 100 of FIG. 1 when the sensed value becomes greater than a down threshold th, in which curve 200 represents the sensed value at this time and curve 202 represents the sensed value at the last time. FIG. 6 shows the difference between the sensed values 200 and 202 of FIG. 5, and FIG. 7 shows a detected signal 204. In a detection of the sensed value on the touchpad 100, when the sensed value is detected greater than the down threshold th as shown in FIG. 5, the detected signal 204 will transit from low to high as shown in FIG. 7, and then, within a reference time interval $T_{DownDetect}$, the sensed value on the touchpad 100 is continuously detected and the differential sensed value dV is calculated by subtracting each current sensed value 202 by the last sensed value 200 as shown in FIG. 6. If the differential sensed value dV within the reference time interval $T_{DownDetect}$ maintains positive, it is determined that an object touches down to the touchpad 100.

<Detection for Verifying an Object Lift>

Figure 8:
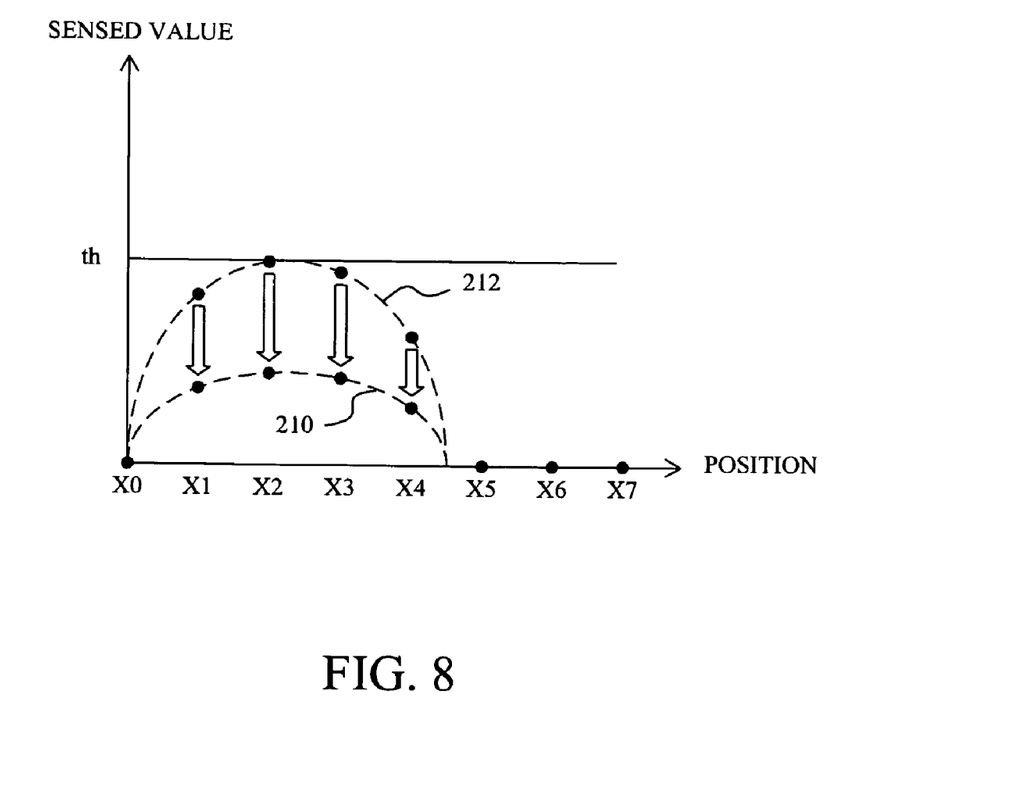
FIG. 8 shows a variation of the sensed value on the touchpad shown in FIG. 1 when the sensed value becomes less than a lift threshold.
Figure 9:
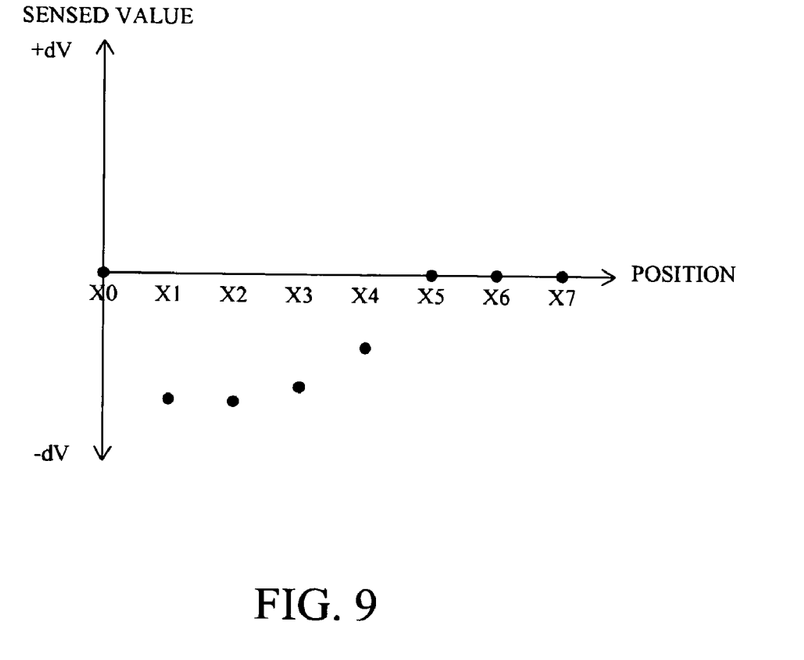
FIG. 9 shows a difference between two sensed values shown in FIG. 8.
Figure 10:
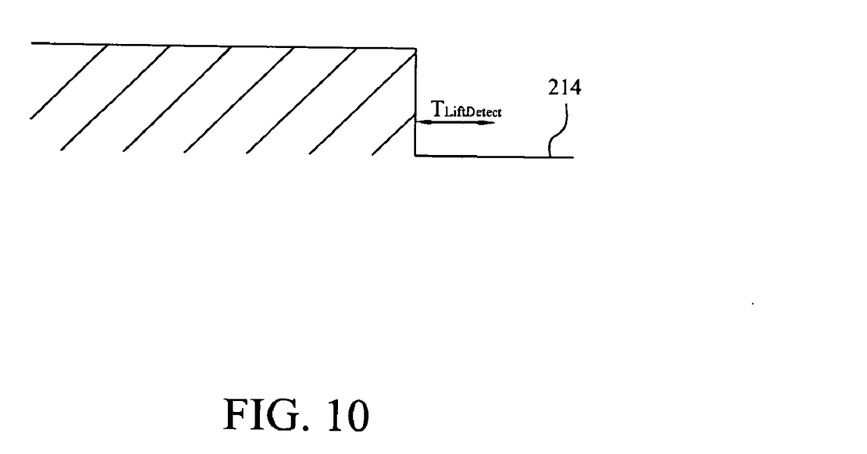
FIG. 10 shows a detected signal.

FIG. 8 shows a variation of the sensed value on the touchpad 100 of FIG. 1 when the sensed value becomes less than a lift threshold th, in which curve 210 represents the sensed value at this time and curve 212 represents the sensed value at the last time, FIG. 9 shows the difference between the sensed values 210 and 212 of FIG. 8, and FIG. 10 shows a detected signal 214. After an object has touched on the touchpad 100, once the sensed value is detected less than the lift threshold th as shown in FIG. 8, the detected signal 214 will transit from high to low as shown in FIG. 10, and then, within a reference time interval $T_{LiftDetect}$, the sensed value on the touchpad 100 is continuously detected and the differential sensed value dV is calculated by subtracting each current sensed value 210 by the last sensed value 212 as shown in FIG. 9. If the differential sensed value dV within the reference time interval $T_{LiftDetect}$ maintains negative, it is determined that the object leaves from the touchpad 100.

<Detection for Verifying an Object Moving>

Figure 11:
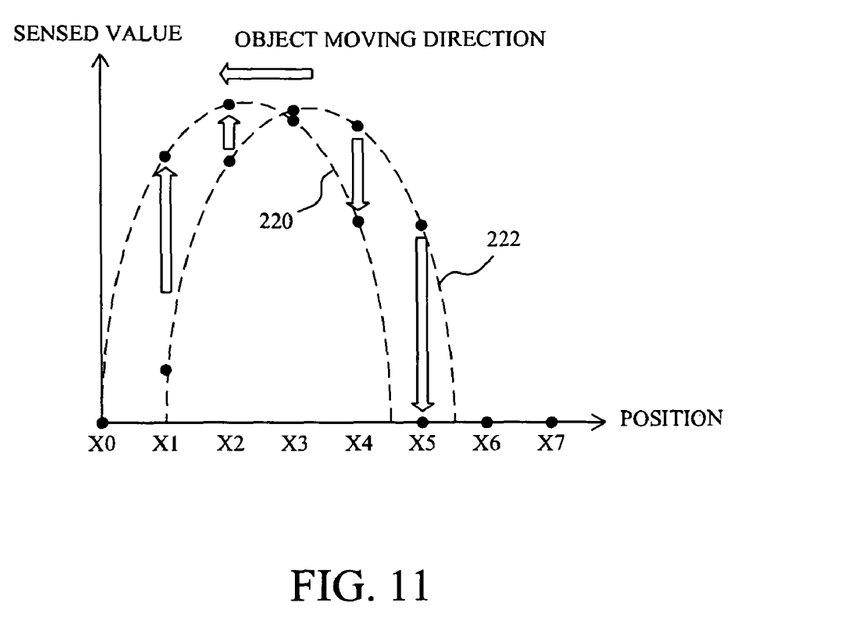
FIG. 11 shows a variation of the sensed value on the touchpad shown in FIG. 1 when an object moves from still to left side.
Figure 12:
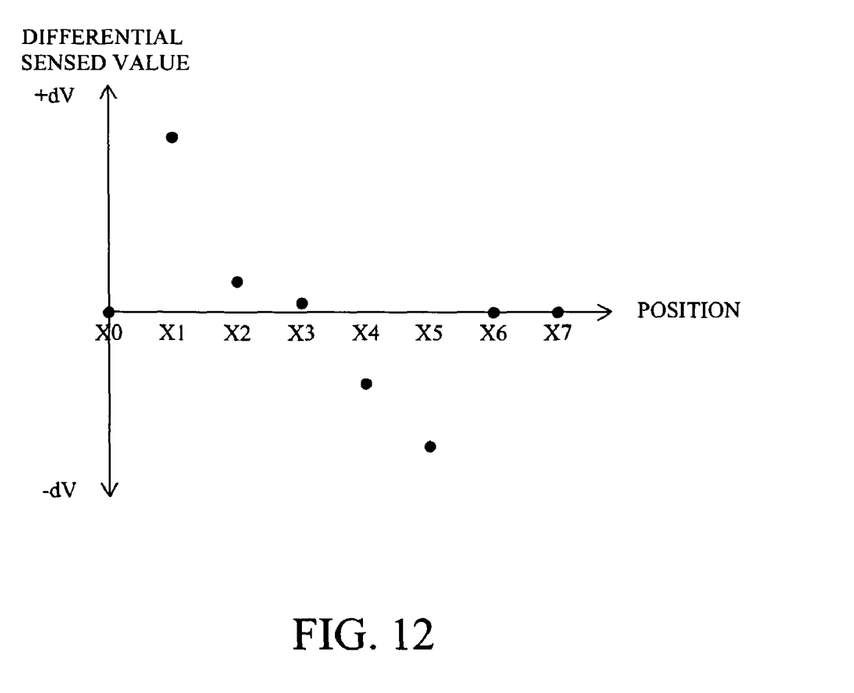
FIG. 12 shows a difference between two sensed values shown in FIG. 11.

The variation of an object on the touchpad 100 from still to move is verified to avoid noise or slight vibration of the object to cause a misjudgment on the object position which will result in the corresponding cursor to have wrong action. FIG. 11 shows a variation of the sensed value on the touchpad 100 shown in FIG. 1 when an object on the touchpad 100 moves from still to left side, in which curve 220 represents the sensed value at this time and curve 222 represents the sensed value at the last time, and FIG. 12 shows the difference between the sensed values 220 and 222 shown in FIG. 11. After an object is verified to touch on the touchpad 100, the sensed value on the touchpad 100 is continuously detected and the differential sensed value dV is calculated by subtracting each current sensed value 220 by the last sensed value 222. Within a reference time interval $T_{MovingDetect}$, if the left side of the object is detected to have the differential sensed value dV in an increasing trend and the right side of the object is detected to have the differential sensed value dV in a decreasing trend as shown in FIGS. 11 and 12, the object is determined to move from still to left side. On the contrary, within the reference time interval $T_{MovingDetect}$, if the left side of the object is detected to have the differential sensed value dV in a decreasing trend and the right side of the object is detected. to have the differential sensed value dV in an increasing trend, the object is determined to move from still to right side.

<Detection for a Tap Gesture>

Figure 13:
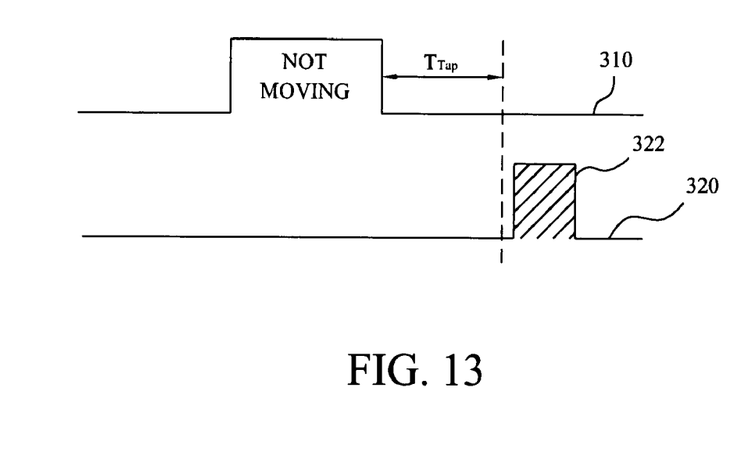
FIG. 13 shows a detected signal and an output signal of an embodiment in a tap gesture.

FIG. 13 shows a detected signal 310 and an output signal 320 in a tap gesture, and the output signal 320 includes a gesture signal 322. In response to an object touching down to the touchpad 100, the detected signal 310 transits from low to high. If the detection for verifying an object down confirms that the object indeed touches down to the touchpad 100, the object is further determined whether or not to move on the touchpad 100 according to the detection for verifying an object moving. If the object is determined to move on the touchpad 100, a moving gesture is determined; otherwise the detected signal 310 will transit from high to low thereafter when the object is determined to leave the touchpad 100 and then, the departure time is counted for the object to leave the touchpad 100. If the detection for verifying an object lift confirms that the object indeed leaves the touchpad 100 and the departure time reaches a reference time interval $T_{Tap}$, the gesture signal 322 (e.g., for a combinational signal of a key-press and a key-release) is produced. In another embodiment, the gesture signal 322 is a voltage level signal that transits from an initial level to another level (e.g., from low to high) when the detection for verifying an object lift confirms that the object indeed leaves the touchpad 100 and the departure time reaches a reference time interval $T_{Tap}$, and then comes back to the initial level after a period of time.

<Detection for a Drag Gesture>

Figure 14:
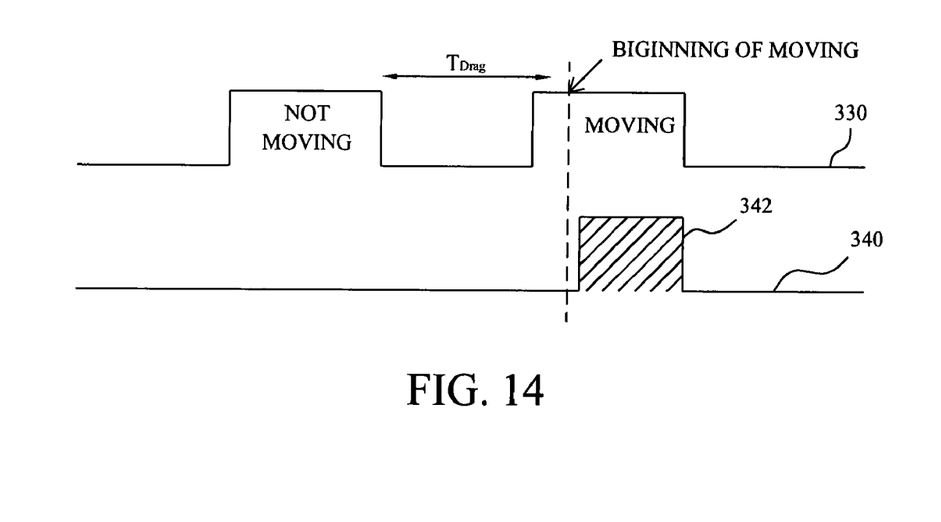
FIG. 14 shows a detected signal and an output. signal of an embodiment in a drag gesture.

FIG. 14 shows a detected signal 330 and an output signal 340 in a drag gesture, and the output signal 340 includes a gesture signal 342. When an object is detected to touch down to the touchpad 100 first time, the detected signal 330 transits from low to high, and if the detection for verifying an object down confirms that the object indeed touches down to the touchpad 100, the object is further determined whether or not to move on the touchpad 100 according to the detection for verifying an object moving. If the object is determined to move on the touchpad 100, a moving gesture is determined; otherwise the detected signal 330 will transit from high to low thereafter when the object is determined to leave the touchpad 100 and then, the departure time is counted for the object to leave the touchpad 100. If the detection for verifying an object lift confirms that the object indeed leaves the touchpad 100 and then the touchpad 100 is detected to be touched again before the departure time reaches a reference time interval $T_{Drag}$, the detected signal 330 transits from low to high again. After the detection for verifying an object down confirms that the touchpad 100 is indeed touched by an object again, the object is determined whether or not to move on the touchpad 100 according to the detection for verifying an object moving. If the object indeed moves on the touchpad 100, the position information of the object is calculated and the gesture signal 342 (e.g., for a combinational signal of a key-press with the position information) is produced. Until the object is detected to leave the touchpad 100, the detected signal 330 transits from high to low again, and the gesture signal 342 is terminated when the detection for verifying an object lift confirms that the object indeed leaves the touchpad 100. Typically, the position information of an object on the touchpad 100 may have an absolute coordinate, a relative coordinate, or a relative displacement of the object. The absolute coordinate is referred to a coordinate value generated with a fixed position (e.g., the center or a corner of the touchpad 100) as the original point, the relative coordinate is referred to a coordinate value generated with a relative position (e.g., the position first touched by the object on the touchpad 100) as the original point, and the relative displacement is referred to a displacement relative to the original point.

<Detection for a Double Tap Gesture>

Figure 15:
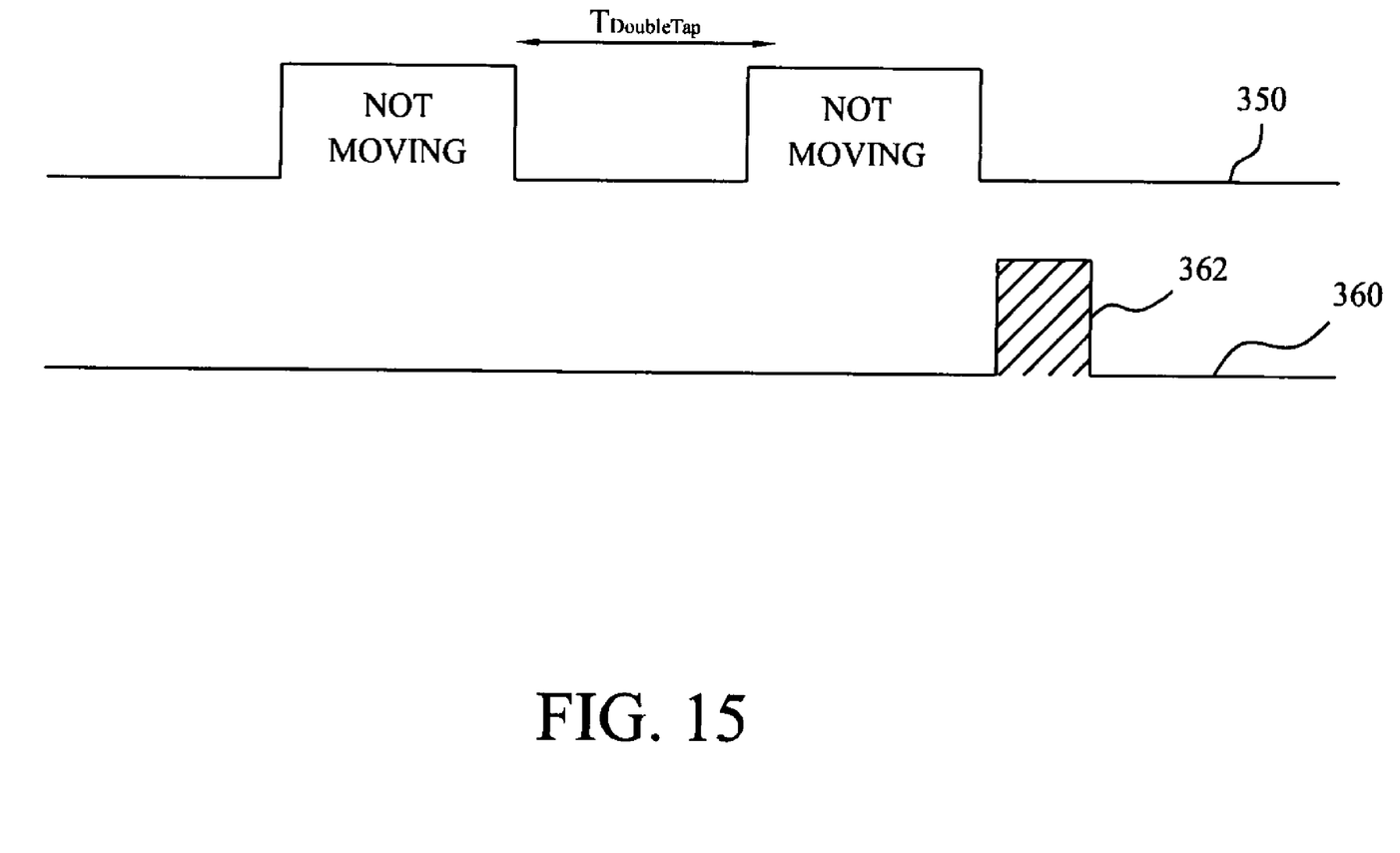
FIG. 15 shows a detected signal and an output signal of an embodiment in a double tap gesture.

FIG. 15 shows a detected signal 350 and an output signal 360 in a double tap gesture, and the output signal 360 includes a gesture signal 362. When an object is detected to touch down to the touchpad 100 first time, the detected signal 350 transits from low to high, and if the detection for verifying an object down confirms that the object indeed touches down to the touchpad 100, the object is further determined whether or not to move on the touchpad 100 according to the detection for verifying an object moving. If the object is determined to move on the touchpad 100, a moving gesture is determined; otherwise the detected signal 350 will transit from high to low thereafter when the object is determined to leave the touchpad 100 and then, the departure time is counted for the object to leave the touchpad 100. If the detection for verifying an object lift confirms that the object indeed leaves the touchpad 100 and then the touchpad 100 is detected to be touched again before the departure time reaches a reference time interval $T_{DoubleTap}$, the detected signal 330 transits from low to high again. After the detection for verifying an object down confirms that the touchpad 100 is indeed touched by an object again, the object is determined whether or not to move on the touchpad 100 according to the detection for verifying an object moving. If the object does not move on the touchpad 100, the detected signal 350 will transits from high to low again when the object is detected to leave from the touchpad 100 again, and after the detection for verifying an object lift confirms that the object indeed leaves the touchpad 100, the gesture signal 362 (e.g., for a combinational signal of a double key-press and a key-release) is produced.

In the above embodiments, various gestures for operating on the touchpad 100 are confirmed with the variation of the sensed value and by determining whether or not the object moves on the touchpad 100, and therefore, in addition to avoid noise to interfere the operations of the touchpad 100, it is also avoided the disadvantage that the touchpad 100 can not determine the operation of indefinite actions, and the convenience of use is improved.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A method for gesture detection on a touchpad, comprising the steps of:
   a. verifying that an object touches on the touchpad, including:
   monitoring a sensed value on the touchpad; monitoring a variation of the sensed value when the sensed value is greater than a threshold; and
   determining that the object touches on the touchpad if the sensed value remains greater than the threshold within a first reference time interval and maintains a continuously increasing trend during the first reference time interval;
   b. determining the movement and direction responsive to a variation of the sensed value of the object on the touchpad;
   the direction that the object moves on the touch pad from a reference position if, during a third reference time interval, the sensed value maintains a continuously increasing trend at points on the touchpad offset from the reference position in a first direction and a continuously decreasing trend at points on the touchpad offset from the reference position in a second direction opposite to the first direction;
   c. verifying that the object leaves the touchpad if the object is determined not to move on the touchpad in step b;
   d. counting a departure time after the object leaves the touchpad; and
   e. producing a gesture signal after the departure time reaches a second reference time interval;
   wherein the increasing and decreasing trends are characterized by the calculated difference between a present and a subsequent sensed value.

2. The method of claim 1, wherein the step of verifying that the object leaves the touchpad comprises the steps of:
   monitoring a sensed value on the touchpad;
   monitoring a variation of the sensed value when the sensed value is less than a threshold; and
   determining that the object leaves the touchpad if the sensed value remains less than the threshold within a third reference time interval and maintains a continuously decreasing trend during the third reference time interval.

3. The method of claim 1, wherein the gesture signal comprises a combinational signal of a key-press and a key-release.

4. The method of claim 1, wherein the gesture signal comprises a voltage level signal.

5. A method for gesture detection on a touchpad, comprising the steps of:
   a. verifying that an object touches on the touchpad, including:
   monitoring a sensed value on the touchpad;
   monitoring a variation of the sensed value when the sensed value is greater than a threshold; and
   determining that the object touches on the touchpad if the sensed value remains greater than the threshold within a first reference time interval and maintains a continuously increasing trend during the first reference time interval;
   b. determining the movement and direction responsive to a variation of the sensed value of the object on the touchpad;
   the direction that the object moves on the touch pad from a reference position if, during a third reference time interval, the sensed value maintains a continuously increasing trend at points on the touchpad offset from the reference position in a first direction and a continuously decreasing trend at points on the touchpad offset from the reference position in a second direction opposite to the first direction;
   c. verifying that the object leaves the touchpad if the object is determined not to move on the touchpad in step b;
   d. counting a departure time after the object leaves the touchpad;
   e. verifying that the object touches on the touchpad if the touchpad is detected to be touched again before the departure time reaches a second reference time interval;
   f. determining the movement and direction responsive to a variation of the sensed value of whether the object on the touchpad;
   g. calculating the position information of the object and initiating a gesture signal if the object moves on the touchpad; and
   h. terminating the gesture signal when the object leaves the touchpad;
   wherein the increasing and decreasing trends are characterized by the calculated difference between a present and a subsequent sensed value.

6. The method of claim 5, wherein the step of verifying that the object leaves the touchpad comprises the steps of:
   monitoring a sensed value on the touchpad;
   monitoring a variation of the sensed value during a time interval when the sensed value is less than a threshold; and
   determining that the object leaves the touchpad if the sensed value remains less than the threshold within a third reference time interval and maintains a continuously decreasing trend during the third reference time interval.

7. The method of claim 5, wherein the gesture signal comprises a combinational signal of a key-press with the position information.

8. The method of claim 5, wherein the position information comprises an absolute coordinate or a relative coordinate.

9. The method of claim 5, wherein the position information comprises a relative displacement of the object on the touchpad.

10. A method for gesture detection on a touchpad, comprising the steps of:
    a. verifying that an object touches on the touchpad, including: monitoring a sensed value on the touchpad;

monitoring a variation of the sensed value when the sensed value is greater than a threshold;

determining that the object touches on the touchpad if the sensed value remains greater than the threshold within a first reference time interval and maintains a continuously increasing trend during the first reference time interval;

b. determining the movement and direction responsive to a variation of the sensed value of the object on the touchpad;

the direction that the object moves on the touch pad from a reference position if, during a third reference time interval, the sensed value maintains a continuously increasing trend at points on the touchpad offset from the reference position in a first direction and a continuously decreasing trend at points on the touchpad offset from the reference position in a second direction opposite to the first direction;

c. verifying that the object leaves the touchpad if the object is determined not to move on the touchpad in step b;

d. counting a departure time after the object leaves the touchpad;

e. verifying that the object touches on the touchpad if the touchpad is detected to be touched again before the departure time reaches a second reference time interval;

f. determining the movement and direction responsive to a variation of the sensed value of the object on the touchpad;

g. verifying that the object leaves the touchpad again if the object is determined not to move on the touchpad in step f; and h. producing a gesture signal;

wherein the increasing and decreasing trends are characterized by the calculated difference between a present and a subsequent sensed value.

11. The method of claim 10, wherein the step of verifying that the object leaves the touchpad comprises the steps of:

monitoring a sensed value on the touchpad;

monitoring a variation of the sensed value during a time interval when the sensed value is less than a threshold; and determining that the object leaves the touchpad if the sensed value remains less than the threshold within a third reference time interval and maintains a continuously decreasing trend during the third reference time interval.

12. The method of claim 10, wherein the gesture signal comprises a combinational signal of a double key-press and a key-release.

* * * * *